May 5, 1970  L. W. McKEE  3,510,185

SPLIT CAGE FOR SPHERICAL BEARING

Filed July 19, 1968

INVENTOR.
Lewis W. McKee
BY
Shenier & O'Connor
ATTORNEYS

United States Patent Office 3,510,185
Patented May 5, 1970

3,510,185
SPLIT CAGE FOR SPHERICAL BEARING
Lewis W. McKee, Brookfield, Conn., assignor to The Barden Corporation, Danbury, Conn., a corporation of Connecticut
Filed July 19, 1968, Ser. No. 746,031
Int. Cl. F16c 23/08, 33/38
U.S. Cl. 308—194                                    14 Claims

ABSTRACT OF THE DISCLOSURE

A split cage for a spherical bearing having two rows of balls in which each half of the cage is an annular body of resilient material formed with a plurality of spaced ball pockets and provided with a plurality of generally radially-outwardly-extending retainer lugs disposed, respectively, between the pockets of pairs of adjacent pockets. The outer diameter of the body at the location of one of the lugs is greater than the inside diameter or raceway entry diameter at the ends of the ring and less than the diameter at the base of the outer ring raceway. To assemble the bearing each cage half is oriented with its central axis at an angle to the axis of the raceway and is then squeezed to move one of the lugs into the raceway. The two halves can then be rotated to a position at which they have a common central axis so that the lugs engage the raceway. The inner ring and balls may then be assembled with the cage and outer ring.

Background of the invention

One form of bearing known in the prior art is the spherical bearing which is a self-aligning bearing having a spherical outer ring raceway and an inner ring provided with a spherical surface on which the balls ride. Generally, there are two sets of balls provided for bearings of this type. It will readily be apparent that the balls of a bearing of this type require a ball cage and that some means must be provided for holding the cage in position in the space between the bearing rings. Various relatively complicated expedients are resorted to in the prior art to achieve an assembly of this type. These arrangements are relatively difficult to assemble and the bearing produced is relatively expensive.

I have invented a split cage for a spherical bearing which overcomes the defects of spherical bearing cage assemblies of the prior art. My cage greatly facilitates the operation of assembling the bearing while at the same time providing means for retaining the cage and balls in the space between the raceways. My cage is relatively inexpensive to construct.

Summary of the invention

One object of my invention is to provide an improved ball cage for spherical bearings.

Another object of my invention is to provide a ball cage for spherical bearings which greatly facilitates the operation of assembling the bearing.

A further object of my invention is to provide a ball cage for spherical bearings which is relatively simple and which is inexpensive.

Other and further objects of my invention will appear from the following description.

In general my invention contemplates the provision of a ball cage for a spherical bearing including two identical cage halves, each of which comprises an annular body of resilient material having a plurality of circumferentially spaced ball receiving pockets and which is provided with a number of generally radially-outwardly-extending, circumferentially elongated retainer lugs having surfaces conforming to the shape of the outer ring raceway and adapted to engage this raceway in the assembled condition of the parts. To assemble a bearing incorporating my improved ball cage, each half of the cage is oriented with its central axis at an angle to the central axis of the outer ring raceway and the annular body is squeezed until the cage half is within the outer ring. Both halves are then rotated to a position at which they abut so as to have a common axis which is coincident with the axis of the outer ring. In this position the retainer lugs engage the surface of the outer ring raceway and the inner ring and balls can readily be assembled therewith, thus to complete the structure.

Brief description of the drawings

In the accompanying drawings which form part of the instant specification and which are to be read in conjunction therewith and in which like reference numerals are used to indicate like parts in the various views.

Description of the preferred embodiment

Figure 1:
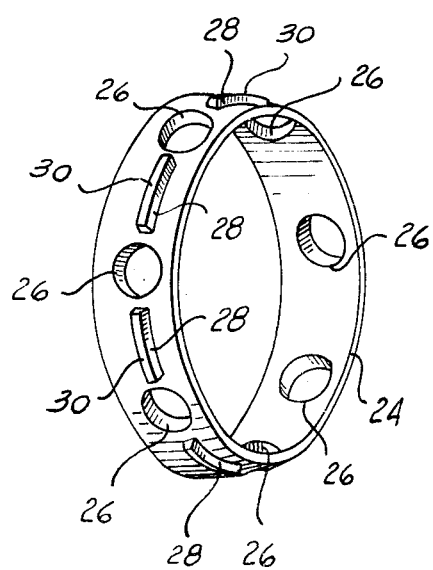
FIG. 1 is a perspective view of half of my improved split cage for spherical bearings.

Referring now to the drawings, the form of bearing, indicated generally by the reference character 10, with which I may use my split cage includes an outer ring 12 formed with a raceway 14. The inner ring 16 of the bearing 10 is formed with a spherical surface 18 on which the rolling elements of the bearing ride. The bearing 10 includes a first set of balls 20 and a second set of balls 22 which, in a manner to be described, are held in position within the space between raceway 14 and surface 18.

My improved split cage includes two identical cage halves 24. Each of the cage halves 24 has an annular body of resilient material formed with a plurality of circumferentially spaced ball receiving pockets 26. It is to be understood that I may employ any suitable material to form the cage halves 24 which will permit them to be momentarily squeezed out of shape when being assembled on the outer ring 12 in a manner to be described and which will cause the half to resume its original shape after it has been assembled in the outer ring.

Each cage half 24 is provided with a plurality of generally radially extending and circumferentially elongated retainer lugs 28. Preferably I dispose each of the lugs at a location between a pair of adjacent pockets 26. In the particular structure I have illustrated in the drawings, I provide each cage half 24 with seven ball pockets 26 and with seven retainer lugs 28. I form each of the lugs 28 with a surface 30 conforming to a portion of the surface of the raceway 14 and adapted to engage the same when the cage half is assembled in the outer ring 12 in a manner to be described. Each of my cage halves 24 can be formed in any appropriate manner known to the art. That is, they may be integrally molded from a suitable resilient material. Alternatively, they may be machined from suitable stock and the lugs 28 may be formed as an integral part of the body, or they may be formed separately and later attached to the annular body. Each of my retainer halves has an outside diameter $D_1$ at the location of a lug 28 which is greater than the entry diameter $D_2$ of the raceway 14 and which is less than the inner diameter $D_3$ of the ring at the base of the raceway.

In use of my improved split cage, in order to assemble two cage halves within the ring 12, I orient the halves so that the axis of the annulus is angularly disposed with relation to the axis of the raceway 14. In this position of the cage half, I squeeze the half until a lug, such as the lug 28, shown at the top of either of the halves 24 in FIG. 3, can be moved into the raceway 14. When both cage halves have been inserted in the ring 12 in this manner, they can be rotated together to the position illustrated in FIG. 2. While I have indicated in FIG. 3 that one half is inserted in the raceway through one side and the other half is inserted in the raceway from the other side, it will readily be appreciated that both halves can be inserted from the same side of the ring 12.

Figure 2:
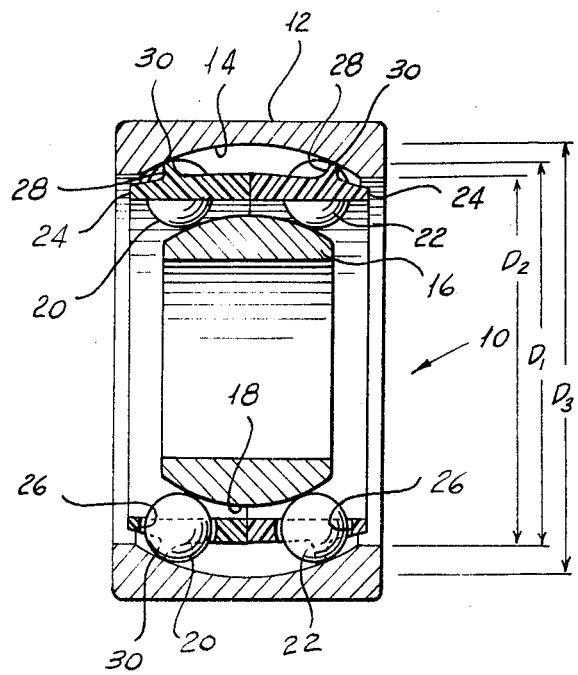
FIG. 2 is a sectional view of a spherical bearing provided with my split cage.
Figure 3:
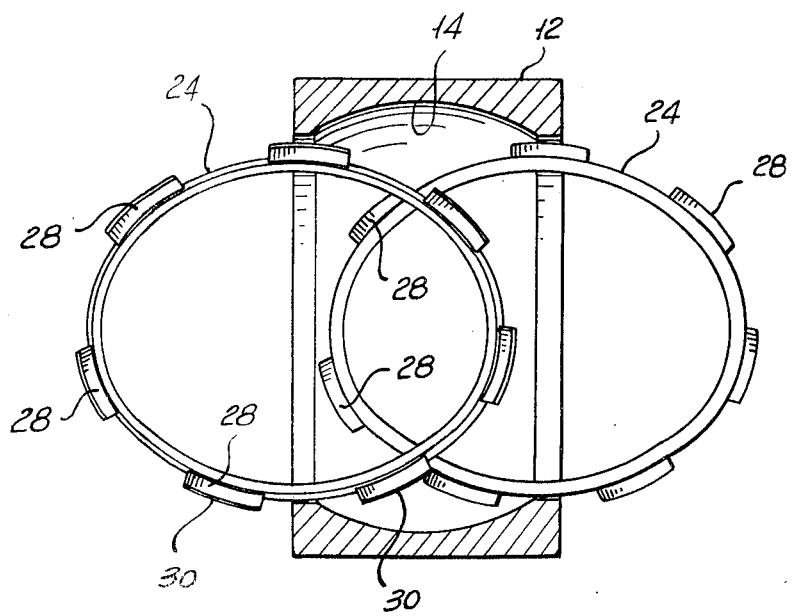
FIG. 3 is a sectional view of a spherical bearing outer ring and showing the manner in which the two halves of my split cage can be inserted into the ring.

It will be noted that, as shown in FIG. 2, each half 24 has a wall with a cross section which tapers slightly from the inner edge of the half toward the outer edge. Stated otherwise, the ring halves are somewhat thicker at one edge than they are at the other. I so assemble the cage halves, as described above, that the two thicker edges are in contiguous relationship as shown in FIG. 2. After the cage halves have been assembled in the outer ring in the manner described, the two sets of balls 20 and 22 and the inner ring 16 can be assembled in the manner known to the art. With all the parts in position, the surfaces 30 of the lugs 28 engage portions of the raceway 14 to hold the parts in assembled relationship once the inner ring 16 has been assembled on a shaft or the like.

It will be seen that I have accomplished the objects of my invention. I have provided an improved ball cage for use with spherical bearings. My cage greatly facilitates the operation of assembling a spherical bearing. The cage itself is simple and inexpensive to manufacture. The two halves of the cage are identical. Owing to the fact that the cage itself is inexpensive and to the fact that it facilitates assembly of the bearing, the resultant spherical bearing is less expensive than are spherical bearings of the prior art.

It will be understood that certain features and subcombinations are of utility and may be employed without reference to other features and subcombinations. It is further obvious that various changes may be made in details without departing from the spirit of my invention. It is, therefore, to be understood that my invention is not to be limited to the specific details shown and described.

Having thus described my invention, what I claim is:

1. In a double row spherical bearing, an assembly including an outer ring formed with a raceway having a concave arcuate cross-sectional shape and having a certain entry diameter at the edges of said raceway, a first cage member comprising an annular body and a retaining lug extending generally radially outwardly of said body, and a second cage member comprising an annular body and a retaining lug extending generally radially outwardly of said body, the outside diameter of each of said bodies at said lugs being greater than said entry diameter, said bodies being assembled in said ring with said lugs in engagement with said raceway.

2. An assembly as in claim 1 in which each of said bodies has a plurality of ball-receiving pockets formed therein.

3. A ball cage assembly as in claim 1 in which said bodies are formed of deformable material.

4. A ball cage assembly as in claim 1 including a plurality of said lugs on each of said bodies circumferentially spaced therearound.

5. A ball cage assembly as in claim 1 in which each of said lugs has a surface conforming to a part of the surface of said raceway.

6. A ball cage assembly as in claim 1 in which each of said bodies has a plurality of circumferentially spaced ball-receiving pockets, each of said bodies provided with a plurality of said lugs disposed between adjacent pockets.

7. A ball cage assembly as in claim 1 in which each of said annular bodies is formed of resilient material, each of said bodies being provided with a plurality of said lugs circumferentially spaced therearound.

8. An assembly as in claim 1 in which each of said bodies has a plurality of said lugs circumferentially spaced therearound adjacent one edge thereof.

9. In a double row spherical bearing an assembly including an outer ring formed wth a raceway having a concave arcuate cross-sectional shape and having a certain entry diameter at the edges of said raceway, a first cage member comprising an annular body of resilient material provided with a plurality of circumferentially spaced ball pockets and a plurality of circumferentially spaced generally radially outwardly extending retaining lugs, and a second cage member comprising an annular body of resilient material provided with a plurality of circumferentially spaced ball receiving pockets and a plurality of circumferentially spaced generally radially outwardly extending retaining lugs, the outside diameter of each of said bodies at the location of one of said lugs being greater than said entry diameter, said members being assembled in said ring in contiguous relationship with said lugs engaging said raceway.

10. An assembly as in claim 9 in which said lugs have circumferentially elongated surfaces shaped to conform to portions of said raceway.

11. A ball bearing assembly including in combination an outer ring having a raceway formed with a concave arcuate cross-sectional shape with an entry diameter at the edges of said raceway, an inner ring, a first cage member disposed between said rings, said first cage member comprising an annular body provided with a plurality of ball receiving pockets circumferentially spaced therearound and a plurality of circumferentially spaced generally radially outwardly extending retaining lugs in engagement with said raceway, a first plurality of balls disposed in said first member pockets, and a second cage member disposed between said rings in contiguous relationship with said first cage member, said second cage member comprising an annular body provided with a plurality of ball receiving pockets circumferentially spaced therearound and a plurality of circumferentially spaced generally radially outwardly extending retaining lugs engaging said raceway, a second plurality of balls disposed in the pockets of said second member, the outside diameter of each of said bodies at the location of a lug being greater than said entry diameter.

12. A ball bearing assembly as in claim 11 in which said inner ring has a spherical outer surface.

13. A ball bearing assembly as in claim 11 in which said lugs have circumferentially elongated surfaces conforming to the surface of said raceway.

14. A ball bearing cage including in combination an annular body of resilient material, said body being formed with a plurality of circumferentially spaced closed ball pockets, and a plurality of circumferentially spaced, generally radially extending retaining lugs on said body.

References Cited

UNITED STATES PATENTS

| | | | |
|---|---|---|---|
| 1,303,712 | 5/1919 | Newman | 308—201 |
| 2,456,403 | 12/1948 | Goehring | 308—194 |
| 2,865,688 | 12/1958 | Lemont | 308—194 |

FOREIGN PATENTS

| | | |
|---|---|---|
| 130,770 | 2/1957 | Sweden. |
| 172,191 | 12/1921 | Great Britain. |
| 188,209 | 5/1960 | Sweden. |
| 520,342 | 6/1953 | Belgium. |

MARTIN P. SCHWADRON, Primary Examiner

F. SUSKO, Assistant Examiner

U.S. Cl. X.R.

208—201